United States Patent
Paschall et al.

(10) Patent No.: US 12,031,027 B2
(45) Date of Patent: Jul. 9, 2024

(54) CONVEYOR BELT COVER COMPOUND

(71) Applicant: Akron Polymer Solutions, Inc., Rancho Santa Margarita, CA (US)

(72) Inventors: Douglas Paschall, Rancho Santa Margarita, CA (US); Michael Brendan Rodgers, Leander, TX (US); Adel F. Halasa, Akron, OH (US)

(73) Assignee: Akron Polymer Solutions, Inc.

( * ) Notice: Subject to any disclaimer, the term of this patent is extended or adjusted under 35 U.S.C. 154(b) by 0 days.

(21) Appl. No.: 18/329,852

(22) Filed: Jun. 6, 2023

(65) Prior Publication Data
US 2023/0391989 A1    Dec. 7, 2023

Related U.S. Application Data

(60) Provisional application No. 63/365,901, filed on Jun. 6, 2022.

(51) Int. Cl.
*C08L 7/00*    (2006.01)
*B65G 15/32*    (2006.01)

(52) U.S. Cl.
CPC ............... *C08L 7/00* (2013.01); *B65G 15/32* (2013.01)

(58) Field of Classification Search
CPC .................................. C08L 7/00; B65G 15/32
See application file for complete search history.

(56) References Cited

U.S. PATENT DOCUMENTS

| | | | |
|---|---|---|---|
| 7,999,027 B2 | 8/2011 | Zhamu | |
| 9,574,069 B2 * | 2/2017 | Jasiunas | C08K 5/09 |
| 9,598,564 B2 * | 3/2017 | Jasiunas | B60C 9/02 |
| 10,059,815 B2 * | 8/2018 | Soisson | C08K 7/00 |
| 2002/0139461 A1 | 10/2002 | Pyle | |
| 2010/0096597 A1 | 4/2010 | Prud'Homme et al. | |

(Continued)

FOREIGN PATENT DOCUMENTS

| | | |
|---|---|---|
| CN | 105348604 A | 2/2016 |
| CN | 105949534 A | 9/2016 |

(Continued)

OTHER PUBLICATIONS

CN 10292363 text translation. (Year: 2023).*

(Continued)

*Primary Examiner* — Mark A Deuble
(74) *Attorney, Agent, or Firm* — Emerson Thomson Bennett; Daniel A. Thomson

(57) ABSTRACT

Graphene is an allotrope or one of the several physical forms of carbon, other examples being graphite, fullerenes, and diamond. At the atomic level, it is in the form a sheet with a thickness nominally under 1.0 nanometer and up to 1 micron in diameter. Sheets of such dimensions when added to other composites facilitate increases in thermal and electrical conductivity and in the case of elastomer nanocomposites, improvements in hysteresis, compounding ingredient dispersion, aging resistance, and reductions in permeability. In the case of conveyor belt cover compounds, natural rubber based formulations are preferred due to high tensile strength, tear strength and damage resistance, and high resistance to abrasion. Graphene as a performance additive enables further improvement in these critical properties.

16 Claims, 1 Drawing Sheet

(56) References Cited

U.S. PATENT DOCUMENTS

Figure 1:
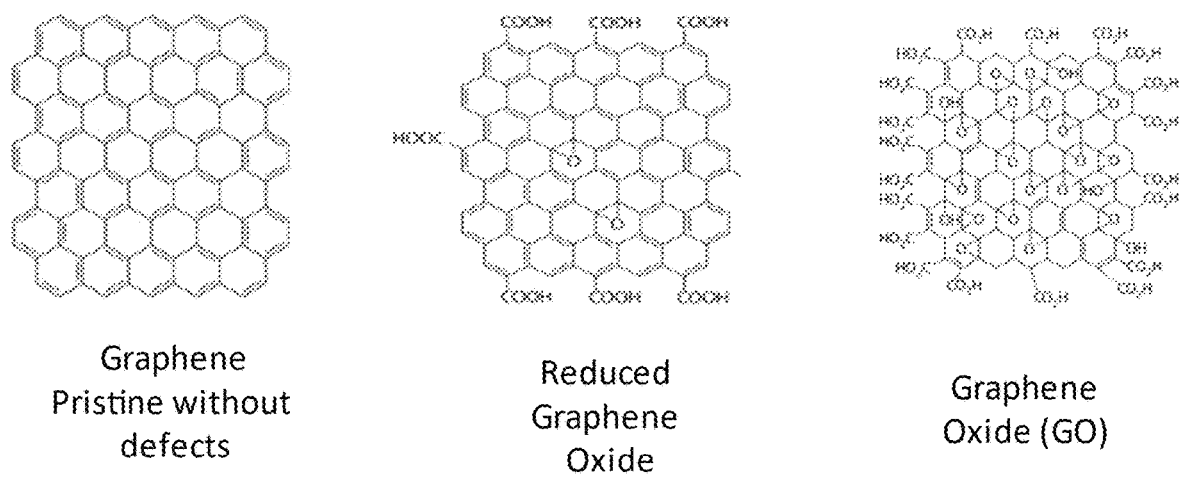

| | | | |
|---|---|---|---|
| 2011/0046289 A1 | 2/2011 | Zhamu et al. | |
| 2011/0060086 A1* | 3/2011 | Rodgers | C08K 3/346 |
| | | | 524/451 |
| 2013/0150516 A1 | 6/2013 | Lettow | |
| 2013/0296479 A1 | 11/2013 | Martin | |
| 2015/0299437 A1 | 10/2015 | Mruk et al. | |
| 2017/0144491 A1 | 5/2017 | Dahlke et al. | |
| 2018/0215904 A1 | 8/2018 | Cesareo | |
| 2019/0256694 A1 | 8/2019 | Nakamura | |
| 2021/0155780 A1 | 5/2021 | Dennis-Pelcher | |
| 2022/0056599 A1 | 2/2022 | Han et al. | |

FOREIGN PATENT DOCUMENTS

| | | | | |
|---|---|---|---|---|
| CN | 106009072 A | | 10/2016 | |
| CN | 106582810 A | | 4/2017 | |
| CN | 106674632 A | | 5/2017 | |
| CN | 107189307 A | | 9/2017 | |
| CN | 109292363 B | * | 5/2020 | B65G 15/38 |
| CN | 108192169 B | | 6/2020 | |
| CN | 114106433 A | | 3/2022 | |
| EP | 2313256 B1 | | 12/2020 | |
| FR | 3090668 A1 | | 6/2020 | |
| JP | 6175731 B2 | | 8/2017 | |
| WO | WO2015181982 A1 | | 12/2015 | |
| WO | 2020-247663 A1 | | 12/2020 | |
| WO | WO2021052951 A1 | | 3/2021 | |
| WO | WO2021102523 A1 | | 6/2021 | |

OTHER PUBLICATIONS

Paschall, D. et al., "Graphene as an additive to rubber compounds and products", Rubber News, technical, pp. 14-19 [retrived on Nov. 1, 2021], Retrived from the Internet: <URL: https://s3-prod.rubbernews.com/2021-11/RPN_20211101_tech_notebook.pdf>. pp. 16-18; tables 2, 5.

Heo, Joo Hyung; International Search Report; Korean Intellectual Property Office; PCT/US2023/067977; dated Sep. 25, 2023; 5 pages.

Heo, Joo Hyung; International Written Opinion; Korean Intellectual Property Office; PCT/US2023/067977; dated Sep. 25, 2023; 6 pages.

Heo, Joo Hyung; Korean International Search Report; PCT/US2022/072241; dated Sep. 5, 2022; 5 pages.

Heo, Joo Hyung; Korean Written Opinion; PCT/ US2022/072241; dated Sep. 5, 2022; 6 pages.

Heo, Joo Hyung; PCT International Search Report; PCT/US2022/073732; dated Nov. 7, 2022; 5 pages.

Heo, Joo Hyung; PCT Written Opinion; PCT/US2022/073732; dated Nov. 7, 2022; 6 pages.

Chandrasekaran, "2: Brief Notes on Compounding Ingredients", Essential Rubber Formulary: Formulas for Practitioners, William Andrew Publishing/Plastics Design Library, 5-7 (Year: 2007).

Heo, Joo Hyung; PCT International Search Report; PCT/US2022/073791; dated Nov. 11, 2022; 4 pages.

Heo, Joo Hyung; PCT Written Opinion; PCT/US2022/073791; dated Nov. 11, 2022; 6 pages.

Sun, Zhenyu et al., "High-Concentration Graphene Dispersions with Minimal Stabilizer: A Scaffold for Enzyme Immobilization for Glucose Oxidation," Chemistry Europe J., 2014, 20, 5752-5761, 11 pages.

Luna, Luis Augusto Visani et al., "Comparative in vitro toxicity of a graphene oxide-silver nanocomposite and the pristine counterparts toward macrophages," Journal of Nanobiotechnology, 2016, 14:12, 17 pages.

Heo, Joo Hyung; PCT Search Report; PCT/US2023/065459; dated Aug. 7, 2023; 3 pages.

Heo, Joo Hyung; PCT Written Opinion; PCT/US2023/065459; dated Aug. 7, 2023; 3 pages.

Wang, H. et al., "Pristine graphene dispersion in solvents and its application as a catalyst support: a combined theoretical and experimental study", J. mater. chem. A, 2015, vol. 3, pp. 6282-6285.

Yam, K. M. et al., "Graphene-based heterogeneous catalysis: role of graphene", Catalysts, 2020, vol. 10, No. 53, pp. 1-17.

* cited by examiner

Graphene Forms

Simple Schematic of a Belt Construction

CONVEYOR BELT COVER COMPOUND

I. BACKGROUND

This application claims priority to U.S. Provisional patent application, Ser. No. 63/365,901, filed Jun. 6, 2022, the contents of which are incorporated herein by reference. Graphene is an allotrope of carbon, other examples being graphite, fullerenes, and diamond, an allotrope being one of various forms an element may assume. At the atomic level, it is in the form of a sheet with a thickness nominally under 1.0 nanometer and up to 1 micron in diameter. Sheets of such dimensions when added to other materials to form composites facilitate increases in thermal and electrical conductivity; and in the case of elastomer nanocomposites, improvements in hysteresis, compounding ingredient dispersion, aging resistance, and reductions in permeability.

At the molecular level, graphene has a hexagonal lattice structure of isolated, single-layer plates of graphene which can be directly seen with transmission electron microscopy of sheets of graphene suspended between bars of a metallic grid. Some of these images show a rippling of the flat sheet, with amplitude of about one to three nanometers. Graphene has a theoretical specific surface area (SSA) of 2500 to 2700 $m^2/g$. This is much larger than carbon black (typically less than 900 $m^2/g$) or carbon nanotubes. With sheet thickness of less than 1.0 nanometer and diameters of over 1.0 micron, graphene is different than that observed with other rubber nanocomposites such as those containing clays. There are essentially three forms of graphene, i) graphene oxide (GO); ii) reduced graphene oxide; and iii) pure graphene (FIG. 1). Pure graphene, or pristine graphene, when exfoliated into monolayer sheets will be inert, i.e., no chemical functionality such as carboxylic acid, ketone, aldehyde, or hydroxyl groups on the graphene plate surface or plate edges observed in other graphene oxide derivatives.

Graphene in polymer or rubber nanocomposites has been reported to have many unique properties such as antioxidant properties, thermal conductivity, and electrical conductivity. Abrasion resistance of rubber nanocomposites is also noted suggesting better tire wear. In addition, improvement in hysteresis as measured by the loss modulus divided by the storage modulus or tangent delta has also been reported. In this instance improvements or reductions in rubber compound hysteresis are seen.

A nanocomposite is a polymer containing nano-sized dispersed particles such as graphene. In this aspect, rubber nanocomposites are based on isobutylene elastomers and graphene, under the commercial name, Prophene™, which has particles having large aspect ratios, i.e., where the graphene plate thickness is up to about 1.0 micron, but the plate width can be between about 0.3 nm (3)A° and about 1.0 nm. The graphene will be exfoliated in butyl rubber, i.e., separated into individual sheets, sets of sheets, or several sheets together, but not in an aggregated state or intercalated condition with sheets stacked upon one another.

Use of conveying technologies offered by conveyor belt systems will be a component in sustainable economic growth. For example, in open mining systems, conveyor belts can have as low as 4% of the environmental impact compared to large dump trucks in such an applications. This is possible since belts will cause:

1. Less environmental damage
2. Reduce $CO_2$ emissions
3. Eliminate the need for roads
4. Lower operating costs compared to trucks

II. SUMMARY

Belt conveyor systems are typically made of rubber with reinforcement members made of either fabric or steel cables. Conveyor belt systems can be complex but essentially consist of six parts, as follows:
1. The conveyor belt
2. Drive motor
3. Supports
4. Tightening system
5. Loader at the beginning of the line
6. Take-off system at the end The conveyor belt consists of three primary parts, a reinforcement or load bearing component made from polyester or nylon fabric, or alternatively steel wires, friction layers of rubber between the load bearing reinforcements, and rubber cover compounds both at the top and bottom of the belt.

In conveying systems where there is more than one belt, each belt is referred to as flight. Thus, in large mines where loads are transported over many kilometers, there will be multiple belt sections or flights. This also is more environmentally friendly. The footprint and cost of a conveying system are much more favorable compared to the environmental impact of using large trucks for hauling materials in mines. In some instances, open mine conveyor belt systems can extend to well over 20 kilometers, so the cost effectiveness will be significant.

Figure 2:
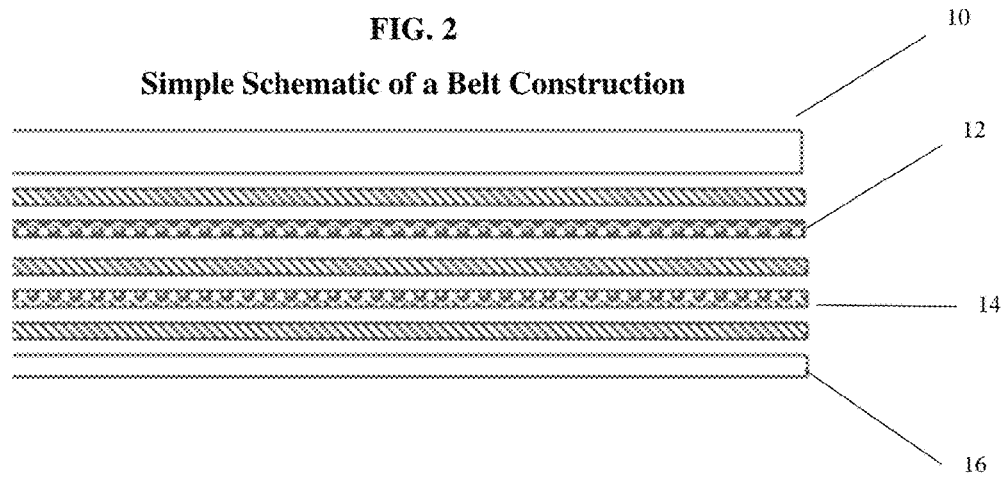

The drive system can take one of several configurations depending on the type of service and loads being transported. Two examples are shown in FIG. 2. The first example in FIG. 2A is a simple system suitable for low power systems with adequate friction between the pulley and belt for movement. The limiting factor in use of such systems is the area of contact between the pulley and belts, and the coefficient of friction may be small. By placing an idler by the drive pulley, the area of contact can be increased from 180° up toward 225°, thus allowing greater power transmission to the belt.

If this is still not adequate, dual drive systems can be used (FIG. 2B). The primary drive can be either at the head or discharge end of the belt, with the secondary drive installed elsewhere along the belt line. This increases the belt tension enabling greater load carrying capability, but also requiring greater reinforcement and other higher tensile strength materials Larger conveyor belt systems require supports or idlers which have a trough (FIG. 3). Idlers are essentially rollers mounted on shafts and supports to carry the design load of the system. The trough allows the belt to carry more load per linear meter or foot without spillage. The return end of the belt is typically flat and is mounted on the same supports as the troughed section (FIG. 3).

For longer conveyor belts, belt length can change due to the phenomenon of "creep," stress relaxation, and weather and temperature changes. The resulting variation in belt length will cause uneven tension of sufficient magnitude that slippage can occur if there is no tensioning mechanism. Tensioners, or take-up units, are thus built into the system to ensure evenness (FIG. 4).

In addition to the conveyor belt, drive system and supports or idlers, there will be a feed system. The simplest is a hopper, which drops materials onto the moving belt. More sophisticated systems include short belts or apron conveyors, screw feed systems analogous to a simple extruder, shaking screens, and rotary drums. In all cases the velocity of the material as it drops onto the belt should be near to that of the belt itself (FIG. 5).

Conveyor belt discharge systems have various configurations depending on the load being carried e.g., gravel, powders, tar sand, etc. For self-discharging, no special devices are needed. An example might be the depositing of coal or gravel at the end of the belt line: the load simply falls off the end of the belt positioned at the location where it is needed. At intermediate points along the belt flight several devices can be found depending on the load, i.e.
1. Scrappers: steel rails lying diagonally across the belt diverting material to one side
2. Shuttle conveyors: Conveyors underneath the primary line, and at right angles, which catch loads or belt contents diverting the load to another location as needed
3. Trippers, rollers, or pulleys on the belt line which divert the belt back on itself thereby discharging the load which is caught in a chute underneath
4. Tipping idlers. One side of an idler support is raised so the belt slopes at an angle allowing material to slide off.

Though the major consumer of these products, in terms of volume, is the automotive industry, the conveyor belt market is still the largest segment in terms of material consumption. In fact, after tires, conveyor belts use more rubber polymers than any other industrial product. There are two types of conveyor belts, i) fabric reinforced belts with up to six plies of polyester, nylon, or hybrid polyester—nylon square woven based fabric, and, ii) steel cord which can be either brass coated or galvanized which is usually used if rust resistance is a performance criterion.

A conveyor belt consists of several components (FIG. 6) as follows:
1. The cover compounds, both top and bottom
2. Reinforcement which can be either fabric or steel wire. Fabric reinforced belts typically use polyester with the cords in the longitudinal direction having higher tenacity for load and stress distribution
3. Friction which is a layer of rubber compound between the plies of fabric and can serve as insulation and also as an adhesive layer.

Cover compounds are based on either natural rubber or SBR. If high temperature service environments are envisaged, an EPDM cover could be specified. In the case of very high temperature operating conditions chlorobutyl based compounds are used. Some examples of service conditions and the suggested polymer to be used in the cover compounds have been tabulated in Table II. Some examples of cover compounds are illustrated later. Many of the cover compounds are typical of what is seen for tire compounds, such as truck tire treads and passenger tire fabric ply compounds.

For steel wire reinforced belts, the wires are laid down at opposite twists to each other so as to prevent warping or other distortions.

Premium high performance general applications conveyor belts operating at ambient temperatures which will consist of the major portion of belts operating in such conditions, will have a natural rubber cover compound.

Conveyor belt manufacturing plants can be considered in terms of unit operations, of which there are six stages, very similar to what is found in tire manufacturing. These operations are as follows:
1. Compound Mixing and raw materials inventory
2. Component preparation such as calendering, fabric—rubber coating, and the creel room which is a humidity and temperature controlled where wire is stored before going to the belt building step
3. Belt building
4. Curing
5. Inspection and repairs
6. Shipping A schematic is shown in FIG. 7. Depending on the size of the plant one or two 80 liter internal mixers or Banbury's may be adequate to support the facility, or alternatively a 140 liter machine. Mixing equipment may be cost prohibitive either in initial investment costs or operating efficiency. In such cases, compounds can be obtained from custom mixers.

Two calendering steps are found in conveyor belt manufacturing, the sheeting of the cover compound and friction layer, and the calendering of fabric with a coat compound. The friction may be co-calendered depending on the design of the calender train. In the case of wire reinforced belts a similar calendering operation is found but with the wire exiting a creel room and wire spacing ensured by passing through a comb or spacer apparatus before compound coats the wire cords.

Rolls of sheeted cover compounds, friction, and reinforcement are then plied up, all typically done in-line with the curing press. As the uncured or "green" assembly is transferred into the belt in increments of length, the press closes and the belt is then cured. Many presses have two tiered decks allowing two belts to be cured simultaneously. Two factors considered are i) uniform pressure across the face of the press platens and ii) uniform temperature across the face of the platens, and are discussed below in more depth.

After the belt is cured it is passed to an inspection table for any surface repairs, after which it is ready for shipping. During the shipping process the belt is coiled and wrapped to the customer's specification before leaving the manufacturing facility.

Current trends toward production methods with higher outputs have in common an inevitable move toward higher curing temperatures. However, of immediate concern are three factors in ensuring a correct cure of the belts:
1. Uniform platen pressure across the faces of the curing belts
2. Uniform temperature across the faces of the press platen, i.e., no cold or hot spots, no accumulation of steam condensate in the case of steam cures, or heating element performance in the case of electrical pressures
3. Uniform belt gauges ensuring equal heat transfer rates across the belt surfaces.

Upon curing of the final belt, the quality control operations will cover repair of any surface irregularities or anomalies, followed by any customer specific quality assurance checks and then ensuring compliance with any industry standards such as abrasion, flame resistance, oil resistance or high temperature operation specifications.

Thermal conductivity of the belt cover compounds is considered in ensuring efficient whole belt vulcanization or cure times. Higher thermal conductivity is typically chosen.

III. BRIEF DESCRIPTION OF THE DRAWINGS

The present teachings are described hereinafter with reference to the accompanying drawings.
FIG. 1 shows graphene forms;
FIG. 2 shows a belt construction;

IV. DETAILED DESCRIPTION

FIG. 1 shows three forms of graphene. FIG. 2 shows a schematic of a conveyor belt construction, showing upper cover 10, fabric reinforcement friction 12, 14, and lower cover 16. Among the many aspects of a conveyor belt cover compound are high tear strength, adhesion between the cover compound and the layer of rubber below it such as the friction of tie gum, and excellent abrasion resistance. A high performance conveyor belt cover compound will therefore consist of natural rubber compounded with abrasion resistance carbon black and other compound ingredients to ensure durability in service. These ingredients will include an antioxidant, antiozonant, compound process oil, and a vulcanization system consisting of zinc oxide, stearic acid, sulfur, and an accelerator such t-butyl benzothiazole disulfide (TBBS). A simplified model compound is illustrated in Table I.

Graphene is also added to the rubber and mixed as noted above. Graphene will be added to a rubber formulation, such as one based on natural rubber, at levels from about 0.1 PHR to about 50.0 PHR, including about 0.5 PHR to about 8.0 PHR, In another aspect of the present teachings, the graphene is added at greater than about 0.5 PHR, greater than about 1.0 PHR, greater than about 5.0 PHR, greater than about 10.0 PHR, greater than about 15.0 PHR, greater than about 20.0 PHR, greater than about 25.0 PHR, greater than about 30.0 PHR, greater than about 35.0 PHR, greater than about 40.0 PHR, and greater than about 45.0 PHR. Graphene in this invention is described as in Table II.

TABLE I

Simplified Model Conveyor Belt Cover Compound Based in Natural Rubber

|  | PHR (parts per hundred rubber) |
|---|---|
| Natural Rubber (TSR10) | 100.00 |
| Carbon Black (HAF N330) | 50.00 |
| Process Oil (aromatic type) | 8.00 |
| Antioxidant (TMQ) | 2.50 |
| Antiozonant (6PPD) - Optional | 2.50 |
| Zinc Oxide | 3.0 |
| Stearic Acid | 2.0 |
| Accelerator 1 (CBS) | 1.00 |
| Accelerator 2 (TMTD) - optional | 0.10 |
| Sulfur | 2.00 |
| Retarder (PVI) - optional | 0.15 |

TSR—technical specified rubber
HAF—high abrasion furnace
TMQ—2,2,4-Trimethyl-1,2-Dihydroquinoline polymer
PPD—N-(1,3-dimethylbutyl)-N'-phenyl-1,4-benzenediamine
CBS—N-cyclohexyl-2- benzothiazole sulfenamide
TMTD—Tetramethylthiuram disulfide
PVI—pre vulcanization inhibitor The particle size range of graphene used in the present teachings can range from about 50 nm to about 10 μm. In one aspect, the particle size range is from about 100 nm to about 5 μm. In one aspect, the particle size range is greater than about 50 nm, greater than about 100 nm, greater than about 150 nm, greater than about 200 nm, greater than about 250 nm, greater than about 300 nm, greater than about 350 nm, greater than about 400 nm, greater than about 450 nm, greater than about 500 nm, greater than about 550 nm, greater than about 600 nm, greater than about 650 nm, greater than about 700 nm, greater than about 750 nm, greater than about 800 nm, greater than about 850 nm, greater than about 900 nm, greater than about 950 nm, greater than about 1 μm, greater than about 2 μm, greater than about 3 μm, greater than about 4 μm, greater than about 5 μm, greater than about 6 μm, greater than about 7 μm, greater than about 8 μm, or greater than about 9 μm. In one aspect, the particle size range is less than about 10 μm, less than about 9 μm, less than about 8 μm, less than about 7 μm, less than about 6 μm, less than about 5 μm, less than about 4 μm, less than about 3 μm, less than about 2 μm, less than about 1 μm, less than about 950 nm, less than about 900 nm, less than about 850 nm, less than about 800 nm, less than about 750 nm, less than about 700 nm, less than about 650 nm, less than about 600 nm, less than about 550 nm, less than about 500 nm, less than about 450 nm, less than about 400 nm, less than about 350 nm, less than about 300 nm, less than about 250 nm, less than about 200 nm, less than about 150 nm, or less than about 100 nm. The form is plate-like rather that cylindrical or fibrous. To further define the material, carbon content is greater than 95%, and in one aspect greater than 99%. The carbon content can be greater than 96%, greater than 97%, or greater than 98% as well. Ash and oxygen content is less than 1% in one aspect of the present teachings. In one aspect, the average particle thickness is about 2.5 nm and the number of layers in a particle would is less than 15, thus allowing attainment of a near exfoliated condition when compounded. Specific surface area of the graphene plate will range from 100 m$^2$/gram to 250 m$^2$/gram and in one aspect is about 180 m$^2$/gram. In one aspect, the surface area of the graphene plate is greater than 150 m$^2$/gram, greater than 100 m$^2$/gram, less than 250 m$^2$/gram, less than 200 m$^2$/gram, or less than 150 m$^2$/gram.

TABLE II

Typical Properties of Graphene

| Form | Powder, dark grey, odorless |
|---|---|
| Carbon | >95% |
| Particle size | 50 nm to 10 μm |
| Moisture, Oxygen, Ash | <0.75 wt. %, <2.0 wt. %, <4.5 wt. %, respectively |
| Resistivity | <150 ohm cm |
| Particle (sheet) thickness) | <3.2 nm |
| Particle layers | <16 |
| Specific gravity | 2. gm/cubic centimeter |
| Surface area (specific) | 180 square m$^2$/gm |

Measurement of Properties of Rubber Compositions

Mooney viscosity (ML1+4) at 100° C. measured in accordance with ASTM D1646. Vulcanization kinetics and associated properties was measured by following the procedure in ASTM D5289. Tensile strength and associated data generated through measurement of tensile strength was determined following ASTM D412. Tear strength and adhesion were measured following ASTM D624.

Example 1

Natural rubber based high performance conveyor belt compounds can be typically described as shown in Table III. This compound contains super abrasion resistance furnace carbon black (SAF-super abrasion furnace) with the ASTM designation of N121. Pristine graphene is added at various levels to demonstrate an optimum loading or content, in this case from 0.0 PHR to 10.00 PHR.

TABLE III

Conveyor Belt Cover Compound

| Compound | Grade | 1 |
|---|---|---|
| Natural Rubber | TSR20 | 100.00 |
| Peptizer (Renecit 11) |  | 0.10 |
| Carbon Black | N121 | 50.00 |
| Graphene |  | 0.00 |
| Escorez 1102 |  | 2.00 |
| TDAE (aromatic oil) |  | 3.00 |

TABLE III-continued

Conveyor Belt Cover Compound

| Compound | Grade | 1 |
|---|---|---|
| 6PPD | | 2.50 |
| TMQ | | 1.50 |
| Paraffin wax | | 1.00 |
| Microcrystalline wax | | 1.00 |
| Zinc Oxide | | 4.00 |
| Stearic acid | | 2.00 |
| TBBS | | 1.00 |
| Sulfur | | 1.00 |
| PVI | | 0.20 |

The reference compound in this instance (Table III) is considered representative of compounds for such applications.

Example 2

There are three grades of pristine graphene considered in the study whose properties are described on Table IV. The grade, #2 or PS100 (particle size), was selected for study as it represented the center point of the range of properties for the three available grades.

TABLE IV

Graphene Under the Trade Name Prophene ®

| Grade Number | | PS100 | PS100 | PS150 |
|---|---|---|---|---|
| Form | | Light powder | Light powder | Light powder |
| Color | | Dark grey/Black | Dark grey/Black | Dark grey/Black |
| Odor | | None | None | None |
| Carbon | wt % | 99.50 | 99.00 | 95.00 |
| H2O | wt % | 0.35 | 0.50 | 0.75 |
| O2 | wt % | <1.0 | <1.0 | <2.0 |
| Ash | wt % | <0.1 | <0.5 | <4.5 |

TABLE IV-continued

Graphene Under the Trade Name Prophene ®

| Grade Number | | PS100 | PS100 | PS150 |
|---|---|---|---|---|
| Resistivity (Powder) | ohm cm | <50 | <100 | <150 |
| Resistivity (Sheet) | | <10 | <20 | <30 |
| Particle size | nm | 50 nm-5 μm | 100 nm-5 μm | 150 nm-10 μm |
| Mono, bi-tri-layers | | >83% | >70% | >65% |
| Particle thickness | max | 1.7 nm | 2.5 nm | 2.8 nm |
| Layer count | < | 10.00 | <15 | <16 |
| Density | g/cm3 | 2.200 | 2.200 | 2.200 |
| Specific surface area | m2/g | 250.0 | 180.0 | 100.0 |

Example 3

Graphene identified under the name PS100 was added to the natural rubber conveyor belt cover compound at the following increments, 0.5, 1.0, 2.0, 4.0, and 10.0 PHR. The compounds were mixed and Mooney viscosity and vulcanization kinetics determined (Table V). The following was noted 1. Graphene had no impact or effect on compound viscosity, suggesting no impact on compound factory processing properties
2. Addition of graphene did not shift compound vulcanization kinetics
3. Tensile strength, compound elongation at tensile strength breaking point and modulus and 300% strain were not affected by graphene content It is evident that addition of pristine graphene as a compounding ingredient not requiring any reformulation to correct loss in fundamental properties as is typical for many other compounding materials.

TABLE V

Addition of Graphene to Conveyor Belt Cover Compound

| Compound | Grade | 1 | 2 | 3 | 4 | 5 | 6 |
|---|---|---|---|---|---|---|---|
| Natural Rubber | TSR20; RSS2 | 100.00 | 100.00 | 100.00 | 100.00 | 100.00 | 100.00 |
| Peptizer (Renecit 11) | | 0.10 | 0.10 | 0.10 | 0.10 | 0.10 | 0.10 |
| Carbon Black (N12:N121, Alter: N | | 50.00 | 50.00 | 50.00 | 50.00 | 50.00 | 50.00 |
| Pristine Graphene | | 0.00 | 0.50 | 1.00 | 2.00 | 4.00 | 10.00 |
| Escorez 1102 | | 2.00 | 2.00 | 2.00 | 2.00 | 2.00 | 2.00 |
| TDAE (aromatic oil) | | 3.00 | 3.00 | 3.00 | 3.00 | 3.00 | 3.00 |
| 6PPD | | 2.50 | 2.50 | 2.50 | 2.50 | 2.50 | 2.50 |
| TMQ | | 1.50 | 1.50 | 1.50 | 1.50 | 1.50 | 1.50 |
| Paraffinic was | | 1.00 | 1.00 | 1.00 | 1.00 | 1.00 | 1.00 |
| Microcrystalline wax | | 1.00 | 1.00 | 1.00 | 1.00 | 1.00 | 1.00 |
| Zinc Oxide | | 4.00 | 4.00 | 4.00 | 4.00 | 4.00 | 4.00 |
| Stearic acid | | 2.00 | 2.00 | 2.00 | 2.00 | 2.00 | 2.00 |
| TBBS | | 1.00 | 1.00 | 1.00 | 1.00 | 1.00 | 1.00 |
| Sulfur | | 1.00 | 1.00 | 1.00 | 1.00 | 1.00 | 1.00 |
| PVI | | 0.20 | 0.20 | 0.20 | 0.20 | 0.20 | 0.20 |
| Total PHR | | 169.30 | 169.80 | 170.30 | 171.30 | 173.30 | 179.30 |
| Mooney Viscosity | ML1 + 4 | | | | | | |
| ML1 + 4 | 100° C. | 61.63 | 61.66 | 62.20 | 62.20 | 61.06 | 61.69 |
| MDR Rheometer | Temperature | 160° C. | 160° C. | 160° C. | 160° C. | 160° C. | 160° C. |
| MH | | 9.67 | 9.56 | 9.89 | 9.77 | 9.67 | 10.05 |
| ML | | 1.85 | 1.75 | 1.9 | 1.81 | 1.78 | 1.86 |
| Delta Torque | | 7.82 | 7.81 | 7.99 | 7.96 | 7.89 | 8.19 |
| t10 | | 2.55 | 2.45 | 2.65 | 2.52 | 2.45 | 2.66 |
| t50 | | 4.47 | 4.53 | 4.51 | 4.50 | 4.48 | 4.51 |
| t90 | | 6.73 | 6.76 | 6.81 | 6.67 | 6.88 | 6.91 |

TABLE V-continued

Addition of Graphene to Conveyor Belt Cover Compound

| Compound | Grade | 1 | 2 | 3 | 4 | 5 | 6 |
|---|---|---|---|---|---|---|---|
| Tensile Strength | MPa | 26.00 | 27.00 | 26.00 | 26.60 | 26.70 | 25.00 |
| Elongation | % | 568 | 565 | 577 | 593 | 583 | 519 |
| 100% modulus | MPa | 2.10 | 2.00 | 2.10 | 2.20 | 2.50 | 3.10 |
| 200% modulus | MPa | 5.90 | 5.90 | 5.90 | 5.80 | 6.50 | 7.40 |
| 300% modulus | MPa | 11.30 | 11.40 | 11.50 | 11.00 | 11.90 | 13.00 |

Example 4

Tear strength and abrasion resistance were measured on the six compounds illustrated in Table V (see Table VI). At very low levels of pristine graphene, i.e., at 0.5 to 1.0 PHR tear strength improved considerably. Similarly, abrasion resistance demonstrated significant improvement up to 2.0 PHR.

These improvements are achieved with no trade off in any other properties, such as tensile strength, compound processing, and vulcanization properties.

TABLE VI

Effect of Pristine Graphene on Conveyor Belt Compound Tear Strength and Abrasion Resistance

| Compound | Grade | 1 | 2 | 3 | 4 | 5 | 6 |
|---|---|---|---|---|---|---|---|
| Natural Rubber | TSR20; RSS2 | 100.00 | 100.00 | 100.00 | 100.00 | 100.00 | 100.00 |
| Peptizer (Renecit 11) | | 0.10 | 0.10 | 0.10 | 0.10 | 0.10 | 0.10 |
| Carbon Black (N12:N121, Alter: N | | 50.00 | 50.00 | 50.00 | 50.00 | 50.00 | 50.00 |
| Pristine Graphene | | 0.00 | 0.50 | 1.00 | 2.00 | 4.00 | 10.00 |
| Tear Strength | KN/m | 112.85 | 153.4 | 129.67 | 109.91 | 94.07 | 84.37 |
| Abrasion (DIN) | mm$^3$ | 180 | 174 | 143 | 141 | 181 | — |

Non-limiting aspects have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

Having thus described the present teachings, it is now claimed:

1. A conveyor belt comprising:
   natural rubber;
   a peptizer;
   carbon black;
   graphene, wherein the graphene has a thickness of less than about 3.2 nm, a particle size of between about 50 nm and about 10 µm, and contains greater than about 95% carbon;
   aliphatic hydrocarbon resin;
   treated distillate aromatic extract;
   N-(1,3-dimethylbutyl)-N'-phenyl-1,4-benzenediamine;
   2,2,4-trimethyl-1,2-dihydroquinoline;
   paraffinic wax;
   microcrystalline wax;
   zinc oxide;
   stearic acid;
   N-tert-butyl-benzothiazole sulfonamide;
   sulfur; and
   pre vulcanization inhibitor.

2. The conveyor belt of claim 1, wherein the graphene is pristine graphene.

3. A conveyor belt comprising:
   rubber;
   carbon black; and
   graphene, wherein the graphene has a thickness of less than about 3.2 nm, a particle size of between about 50 nm and about 10 µm, and contains greater than about 95% carbon.

4. The conveyor belt of claim 3, wherein the graphene is a graphene plate, wherein the graphene plate is present in the amount of between about 0.5 PHR and about 10.0 PHR.

5. The conveyor belt of claim 4, wherein the graphene plate has a surface area from about 100 m$^2$/gram to about 250 m$^2$/gram.

6. The conveyor belt of claim 5, wherein the graphene plate has an oxygen content of less than about 1%.

7. The conveyor belt of claim 4, wherein the graphene plate is present in the amount of between about 0.5 PHR and about 8.0 PHR.

8. The conveyor belt of claim 7, wherein the graphene plate is present in the amount of between about 1.0 PHR and about 2.0 PHR, wherein the composition has no clay fillers.

9. The conveyor belt of claim 7, wherein the graphene plate is present in the amount of between about 3.0 PHR and about 5.0 PHR.

10. The conveyor belt of claim 3, wherein the thickness of the graphene plate is less than about 1 nm and the aspect ratio of the graphene plate is about 1000.

11. The conveyor belt of claim 3, wherein the conveyor belt further comprises carbon black.

12. The conveyor belt of claim 11, wherein the conveyor belt further comprises:
   a peptizer;
   aliphatic hydrocarbon resin;
   treated distillate aromatic extract;
   an antiozonant; and,
   an antioxidant.

13. The conveyor belt of claim 12, wherein the conveyor belt further comprises:
   paraffinic wax;
   microcrystalline wax;

zinc oxide;
stearic acid;
an accelerator;
sulfur; and
a pre vulcanization inhibitor.

14. The conveyor belt of claim 13, wherein the antiozonant is N-(1,3-dimethylbutyl)-N'-phenyl-1,4-benzenediamine and the antioxidant is 2,2,4-trimethyl-1,2-dihydroquinoline.

15. The conveyor belt of claim 14, wherein the accelerator is N-tert-butyl-benzothiazole sulfonamide and the peptizer is 2,2'-dibenzamido-diphenyldisulphide, wherein the rubber is natural rubber or butyl rubber.

16. The conveyor belt of claim 3, wherein the graphene is pristine graphene.

* * * * *